US009467266B2

United States Patent
Liu et al.

(10) Patent No.: US 9,467,266 B2
(45) Date of Patent: Oct. 11, 2016

(54) METHOD FOR FEEDING BACK UPLINK CONTROL INFORMATION

(71) Applicant: Alcatel Lucent, Boulogne Billancourt (FR)

(72) Inventors: Jin Liu, Shanghai (CN); Xudong Zhu, Shanghai (CN); Fanglei Sun, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 122 days.

(21) Appl. No.: 14/386,740

(22) PCT Filed: Mar. 18, 2013

(86) PCT No.: PCT/IB2013/000606
§ 371 (c)(1),
(2) Date: Sep. 19, 2014

(87) PCT Pub. No.: WO2013/140246
PCT Pub. Date: Sep. 26, 2013

(65) Prior Publication Data
US 2015/0071202 A1    Mar. 12, 2015

(30) Foreign Application Priority Data

Mar. 20, 2012  (CN) .......................... 2012 1 0075285

(51) Int. Cl.
*H04W 4/00* (2009.01)
*H04L 5/00* (2006.01)
(Continued)

(52) U.S. Cl.
CPC ............. *H04L 5/0053* (2013.01); *H04B 7/024* (2013.01); *H04L 5/0035* (2013.01); *H04L 5/0055* (2013.01); *H04L 5/0057* (2013.01); *H04L 1/1671* (2013.01); *H04L 1/1861* (2013.01)

(58) Field of Classification Search
USPC ....... 370/329, 328, 252, 278, 281, 282, 330, 370/436, 478
See application file for complete search history.

(56) References Cited

U.S. PATENT DOCUMENTS 7,885,202 B2    2/2011  Li et al.
2010/0098012 A1  4/2010  Bala et al.
(Continued)

FOREIGN PATENT DOCUMENTS

JP    2012-506671    3/2012
JP    2013-539620    10/2013
(Continued)

OTHER PUBLICATIONS

Texas Instruments, "On Proposed Enhancements to Periodic CSI Reporting", R1-113241, 3GPP TSG RAN WG1#66bis, Zhuhai, China, Oct. 10-14, 2011.
(Continued)

*Primary Examiner* — Chi H Pham
*Assistant Examiner* — Alexander O Boakye
(74) *Attorney, Agent, or Firm* — Fay Sharpe, LLP

(57) ABSTRACT

The present invention provides a method for transmitting uplink control information in coordinated multi-point system. According to an embodiment of the present invention, a method for feeding back channel state information of multiple transmission points in a coordinated multi-point cooperating set is provided, and the method includes: receiving reference signals of the multiple transmission points; based on the reference signals of the multiple transmission points, evaluating channel state information of each of the multiple transmission points; multiplexing and transmitting the channel state information of the multiple transmission points on a physical uplink control channel (PUCCH) of one of the multiple transmission points in a predetermined mapping sequence. The present invention solves the problem caused by coordinated multi-point as to how a user equipment feeds back uplink control information of multiple transmission points on a physical uplink control channel, and is beneficial to further development and application of the coordinated multi-point technology.

15 Claims, 1 Drawing Sheet

(51) Int. Cl.
*H04B 7/02* (2006.01)
*H04L 1/16* (2006.01)
*H04L 1/18* (2006.01)

(56) References Cited

U.S. PATENT DOCUMENTS

| | | | |
|---|---|---|---|
| 2010/0254335 A1* | 10/2010 | Koo | H04W 48/08 370/329 |
| 2010/0278109 A1 | 11/2010 | Papasakellariou et al. | |
| 2011/0243066 A1 | 10/2011 | Nayeb et al. | |
| 2012/0051257 A1* | 3/2012 | Kim | H04B 7/024 370/252 |
| 2012/0113831 A1 | 5/2012 | Pelletier et al. | |
| 2015/0256313 A1 | 9/2015 | Kim et al. | |

FOREIGN PATENT DOCUMENTS

| | | |
|---|---|---|
| RU | 2 383 995 | 3/2010 |
| TW | 201208327 | 2/2012 |

OTHER PUBLICATIONS

Renesas Mobile Europe Ltd., "UCI-only PUSCH Transmission Enhancements", R1-112700, 3GPP TSG-RAN WG1 Meeting #66, Athens, Greece, Aug. 22-26, 2011.
Panasonic, "Uplink Signaling for Carrier Aggregation Enhancement", R1-113802, 3GPP TSG-RAN WG1 Meeting #67, San Francisco, CA, Nov. 14-18, 2011.
Sharp, "UL RS Enhancements to Support Efficient UL CoMP", R1-113824, 3GPP TSG RAN WG1 Meeting #67, San Francisco, CA, Nov. 14-18, 2011.
Samsung, "HARQ-ACK and Periodic CSI Multiplexing in PUCCH for DL CA", R1-114208, 3GPP TSG RAN WG1 Meeting #67, San Francisco, CA, Nov. 14-18, 2011.
Texas Instruments, "CSI Feedback for DL CoMP", R-113249, 3GPP TSG RAN WG1 Meeting #66bis, Zhuhai, P.R. China, Oct. 10-14, 2011.
Texas Instruments, CSI Feedback for DL CoMP, $3^{rd}$ Generation Partnership Project (3GPP), 3GPP TSG RAN WG1 Meeting #66bis, R1-113249, pp. 1-3, XP050538362, Zhuhai, P.R. China, Oct. 10-14, 2011.
Nokia Siemens Networks et al., "CSI payload extension using PUCCH and periodic PUCCH," $3^{rd}$ Generation Partnership Project (3GPP), 3GPP TSG RAN WG1 Meeting #58bis, R1-093911, 3 pages, XP050388413, Miyazaki, Japan, Oct. 12-16, 2009.
Samsung, "CSI Feedback Signaling in LTE-A," $3^{rd}$ Generation Partnership Project (3GPP), 3GPP TSG RAN WG1 #59, R1-094581, pp. 1-3, XP050388995, Jeju, Korea, Nov. 9-13, 2009.
Alcatel-Lucent Shanghai Bell et al., "Multiple CSI Reports on PUCCH for DL CoMP," $3^{rd}$ Generation Partnership Project (3GPP), 3GPP TSG RAN WG1 Meeting #69, R1-122888, pp. 1-6, XP050601169, Prague, Czech Republic, May 21-25, 2012.
International Search Report for PCT/IB2013/000606 dated Jul. 22, 2013.
Samsung, "CSI Signaling in LTE-A", R1-091876, 3GPP TSG RAN WG1 #57, San Francisco, USA, May 4-8, 2009.
Nokia Siemens Networks, et al., "On CSI feedback signaling in LTE-Advanced Uplink", R1-091353, 3GPP TSG RAN WG1, #56bis, Seoul, Korea, Mar. 23-27, 2009.

* cited by examiner

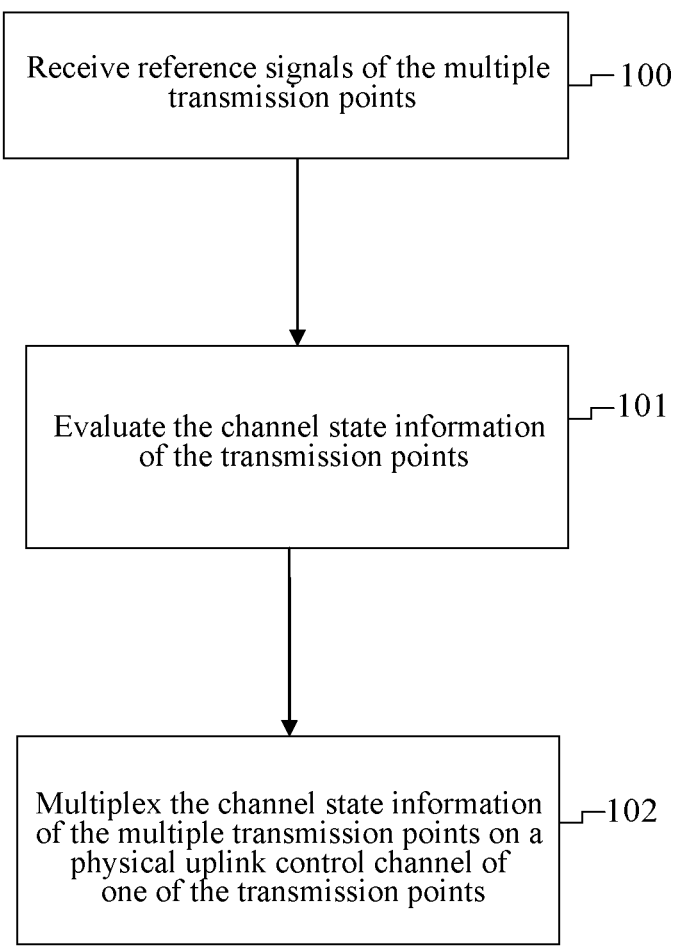

METHOD FOR FEEDING BACK UPLINK CONTROL INFORMATION

BACKGROUND OF THE INVENTION

1. Field of the Invention

The present invention relates to a method for transmitting uplink control information in a wireless communication system, and in particular, to a method for transmitting uplink control information on a physical uplink control channel.

2. Description of the Prior Art

The long term evolution (LTE)/LTE-Advanced project is the largest new technology research and development project started by the 3rd Generation Partnership Project (3GPP) in recent years. Such type of technology with the orthogonal frequency division multiplexing/frequency division multiple access (OFDM/FDMA) technology as core is considered as a "quasi-4G" technology.

According to LTE Rel-8/9/10, uplink L1/L2 control signaling is used to dynamically indicate a downlink and uplink transmission channel. A user equipment uses an uplink control channel, that is, a physical uplink control channel (PUCCH), to report periodic L1/L2 control signaling. The uplink control signaling includes hybrid automatic repeat request-acknowledgements (HARQ-ACK) of a downlink-shared channel (DL-SCH) transmission block for reception and channel state information (CSI) related to downlink channel conditions and a scheduling request, and indicates that the UE is in need of uplink resources for uplink-shared channel (UL-SCH) transmission. Generally, the channel state information further includes a rank indicator (RI), a channel quality indicator (CQI), and a precoding matrix indicator (PMI), where the CQI and the PMI are generally applied together.

With the development of LTE/LTE-Advanced, the coordinated multi-point (CoMP) technology is introduced. The user equipment needs to report a downlink status of multiple transmission points in a cooperating set, so as to assist a base station to coordinate downlink scheduling between different transmission points and execute channel-dependent scheduling. How to ensure that the user equipment can correctly transmit uplink control information of multiple transmission points on a physical uplink control link so as to avoid a conflict between control information of different transmission points has become a problem to be solved in the industry.

SUMMARY OF THE INVENTION

The present invention provides a method for transmitting uplink control information in coordinated multi-point, which solves the problem caused by coordinated multi-point that how a user equipment feeds back uplink control information of multiple transmission points on a physical uplink control channel.

An embodiment of the present invention provides a method for feeding back channel state information of multiple transmission points in a coordinated multi-point cooperating set. The method includes: receiving reference signals of the multiple transmission points; evaluating channel state information of each of the multiple transmission points based on the reference signals of the multiple transmission points; multiplexing and transmitting the channel state information of the multiple transmission points on a physical uplink control channel (PUCCH) of one of the multiple transmission points in a predetermined mapping sequence.

In an embodiment, a PUCCH format for transmission of the channel state information of the multiple transmission points is a PUCCH format 2/2a/2b or a PUCCH format 3, where the PUCCH format 3 is set by upper layer signaling. According to an embodiment, the mapping sequence is preset, or is indicated by upper layer signaling, or is determined according to a sequence of channel state information reference signals. Different user equipments in the coordinated multi-point cooperating set uses the same mapping sequence or different mapping sequences. In an embodiment, in multiplexing, the channel state information of the multiple transmission points is fed back in multiple subframes at a predetermined time offset in the mapping sequence, where each of the multiple subframes merely feeds back one piece of channel state information. The time offset may be set by upper layer signaling. Each of the multiple subframes that feed back the channel state information of the multiple transmission points can feed back hybrid automatic repeat request-acknowledgements occurring in the each subframe. In another embodiment, in multiplexing, the channel state information of the multiple transmission points is transmitted at a predetermined cyclic shift offset in the same sequence in the mapping sequence. The cyclic shift offset may be set by upper layer signaling. In an embodiment, channel state information of other points in the multiple transmission points is transmitted at a cyclic shift offset in the same sequence, with respect to channel state information of a serving point. If hybrid automatic repeat request-acknowledgements exist, the hybrid automatic repeat request-acknowledgements are transmitted together with the channel state information of the serving point or the channel state information of other transmission points in the multiple transmission points. According to another embodiment of the present invention, in multiplexing, the channel state information of the multiple transmission points is transmitted by different time-and-frequency resources in the mapping sequence. The different time-and-frequency resources are set by upper layer signaling. In this case, if hybrid automatic repeat request-acknowledgements exist, the hybrid automatic repeat request-acknowledgements are transmitted together with the channel state information of the serving point or the channel state information of other transmission points in the multiple transmission points. In an embodiment, different multiplexing manners may be combined and used. In addition, in another embodiment, a physical uplink control channel of one of multiple transmission points is a physical uplink control channel of a serving point.

The present invention provides a novel method for feeding back uplink control information on a physical uplink control channel in coordinated multi-point, so that large backhaul overhead is avoided, and no inter-cell interference on the physical uplink control channel is caused, which are beneficial to further development and application of the coordinated multi-point technology.

BRIEF DESCRIPTION OF THE DRAWINGS

FIG. 1 is a flow chart of a method for feeding back channel state information of multiple transmission points in a coordinated multi-point environment according to an embodiment of the present invention.

DETAILED DESCRIPTION

For comprehensive understanding of the spirit of the present invention, the present invention is further described below with reference to some preferred embodiments of the present invention.

According to the type of information included in control signaling, a physical uplink control channel supports 7 different types of uplink control information formats, namely, PUCCH formats 1, 1a, 1b, 2, 2a, 2b and 3. The PUCCH formats 1, 1a and 1b mainly relate to feedback/transmission of HARQ-ACK, and physical uplink control channel allocation is based on a control channel element (CCE) with a lowest number allocated to a downlink of a physical downlink control channel in a serving cell. For each user equipment (UE), the user equipment can merely send two blocks at most, where each block is 1 bit. Therefore, even multiple transmission points provide services for one user equipment, the user equipment can still perform transmission in a conventional single point manner in feeding back the HARQ-ACK. Moreover, a serving cell of the user equipment may also receive the PUCCH formats 1, 1a and 1b, the details of which are not described.

The PUCCH formats 2, 2a and 2b relate to feedback of channel state information and HARQ-ACK. In a communication system using coordinated multi-point technology, each transmission point in a cooperating set has corresponding channel state information (including a rank indicator, a channel quality indicator/a precoding matrix indicator), and for each user equipment, transmission points in a cooperating set corresponding to the user equipment are not fixed, and the number of the transmission points is variable and is not limited. Therefore, how to feed back/transmit channel state information of the multiple transmission points on a physical uplink control channel is a critical problem in uplink control information feedback in coordinated multi-point.

One optional solution is that the user equipment transmits corresponding channel state information on a physical uplink control channel of a transmission point, and multiple transmission points exchange the channel state information with each other through a backhaul. Obviously, this manner definitely brings about a large backhaul overhead. In addition, as physical uplink control channels of different cells are random and may be not orthogonal, serious inter-cell interference on the physical uplink control channel may be caused.

According to a method for feeding back channel state information of multiple transmission points in a PUCCH format 2, 2a or 2b provided by an embodiment of the present invention, channel state information of different transmission points is multiplexed and transmitted on a PUCCH of one transmission point, and the problem mentioned above does not occur.

FIG. 1 is a flow chart of a method for feeding back channel state information of multiple transmission points 10 in a cooperating set in a coordinated multi-point environment according to an embodiment of the present invention. Generally, for a certain serving cell (namely, a base station managing a serving cell), a serving base station has a cooperating set for coordinated multi-point defined by the serving base station. The serving base station sets a cooperating subset for a user equipment belonging to this serving cell based on the cooperating set, and transmission points in the cooperating subset provides a coordinated multi-point service for the user equipment. The transmission points in the cooperating subset may be a part of or all transmission points in the cooperating set.

For a user equipment in this serving cell, in Step 100, the user equipment receives reference signals of the multiple transmission points, for example, a channel state information reference signal. These transmission points belong to the coordinated multi-point cooperating set, but may not belong to a cooperating subset that provides the coordinated multi-point service for the user equipment, and may be measurement transmission points that the serving base station indicates measurement. Because the serving base station needs to maintain the cooperating subset that provides a cooperation service for the user equipment, a new transmission point with better channel quality is added or a transmission point with deteriorated channel quality is removed according to the channel status of the transmission point fed back by the user equipment. In Step 101, the user equipment evaluates the channel state information of the transmission points based on the received reference signals of the multiple transmission points. Then, in Step 102, the channel state information of the multiple transmission points obtained through evaluation is multiplexed on a physical uplink control channel of one of the transmission points, such as a serving point, in a predetermined mapping sequence, and is fed back/transmitted to the serving base station.

The mapping sequence is a sequence when the channel state information corresponding to the transmission points is multiplexed to the single physical uplink control link. The mapping sequence may be preset according to a protocol, or is indicated to all user equipments in this serving cell by upper layer signaling broadcast, or is determined according to a sequence of channel state information reference signals. Different user equipment in the same serving cell may use the same mapping sequence to perform multiplexing, and may also use different mapping sequences, for example, a mapping sequence set by upper layer signaling, to perform multiplexing.

According to an embodiment of the present invention, specific multiplexing manner may be time-division multiplexing, code-division multiplexing, and frequency-division multiplexing, or a combination thereof.

In an embodiment using time-division multiplexing, channel state information from multiple transmission points of one user equipment is transmitted in one PUCCH resource, that is, with the same frequency resource and the same cyclic shift of an orthogonal sequence. The channel state information of the multiple transmission points is fed back in multiple subframes at a predetermined time offset in a mapping sequence, and each subframe merely feeds back one piece of channel state information. If channel state information of a serving point is placed in a first subframe, channel state information of the other transmission points is sequentially placed in other subsequent subframes at a time offset. The time offset may be set by upper layer signaling. If hybrid automatic repeat request-acknowledgements occur in one subframe transmitting the channel state information, the hybrid automatic repeat request-acknowledgements may be transmitted together with the channel state information in this subframe. That is to say, each of these subframes feeding back the channel state information of the multiple transmission points can feed back hybrid automatic repeat request-acknowledgements occurring in this frame.

In an embodiment using code-division multiplexing, channel state information from multiple transmission points of a user equipment is allocated in the same time-and-frequency resource of a PUCCH (or, may be different assigned time-and-frequency resources), and is transmitted at a predetermined cyclic shift offset in a predetermined sequence in a mapping sequence; the channel state information of the transmission points is divided according to the cyclic shift offset. For example, channel state information of a serving point may serve as a first value of an orthogonal sequence, and channel state information of the other transmission points form the orthogonal sequence together with the first value at a predetermined shift offset by the same frequency resource. That is, channel state information of the other points in the multiplex transmission points is transmitted at a cyclic shift offset in the same sequence with respect to the channel state information of the serving point. Similarly, the cyclic shift offset may be set by upper layer signaling. In code-division multiplexing, if hybrid automatic repeat request-acknowledgements exist, the hybrid automatic repeat request-acknowledgements are transmitted together with the channel state information of the serving point or the channel state information of the other transmission points in the multiple transmission points, for example, a transmission point with a minimum index.

In an embodiment using frequency-division multiplexing, channel state information from multiple transmission points of one user equipment is transmitted in the same subframe by different time-and-frequency resources. These different time-and-frequency resources may be set by upper layer signaling and directly or indirectly indicated to the user equipment. Similarly, in frequency-division multiplexing, if hybrid automatic repeat request-acknowledgements exist, the hybrid automatic repeat request-acknowledgements are transmitted together with channel state information of a serving point or channel state information of other transmission points in the multiple transmission points, for example, a transmission point with a minimum index.

The time-division multiplexing, code-division multiplexing, and frequency-division multiplexing each have advantages and disadvantages, for example, compared with time-division multiplexing, code-division multiplexing can significantly reduce a scheduling delay when multiple pieces of channel state information are transmitted at the same time. Persons of ordinary skill in the art can select time-division multiplexing, code-division multiplexing, or frequency-division multiplexing or use a combination thereof according to actual application. For example, in an embodiment, each two transmission points may serve as one report group, and code-division multiplexing is implemented on channel state information of the two transmission points in the group, and then time-division multiplexing is implemented between report groups.

In addition, although the PUCCH format 3 merely includes HARQ-ACK currently, the structure can be used to transmit a high control information load, for example, to transmit channel state information, which can be implemented through setting by upper layer signaling, including setting whether the PUCCH format 3 transmits the channel state information and setting the structure when transmitting the channel state information by upper layer signaling. Definitely, for persons of ordinary skill in the art, once the upper layer signaling indicates that the PUCCH format 3 transmits the channel state information, the feedback manner of the PUCCH formats 2, 2a and 2b can also be directly used.

It should be noted that, due to the development of the technology and the update of the standard, parts with the same function may always have multiple different names, especially the LTE in continuous development. Technical names used in the invention patent specification are used for interpretation and presentation of the technical solutions of the present invention, and consensus function in the art shall prevail, and arbitrary interpretation of the similarities and differences of the name should be avoided.

The technical solutions and technical features of the present invention have been disclosed as above, however, persons skilled in the art still can made various replacements and modifications based on the teaching and disclosure of the present invention without depart from the spirit of the present invention. Therefore, the protection scope of the present invention should not be limited to the disclosure of the embodiments, but should include various replacements and modifications without departing from the present invention, and are covered by the claims of the present invention.

We claim:

1. A method for feeding back channel state information (CSI) of multiple transmission points in a coordinated multi-point cooperating set, the method comprising:
receiving reference signals of the multiple transmission points;
based on the reference signals of the multiple transmission points, evaluating channel state information of the multiple transmission points;
multiplexing and transmitting the channel state information of the multiple transmission points on a physical uplink control channel (PUCCH) of one of the multiple transmission points in a predetermined mapping sequence, wherein the mapping sequence is preset, or is indicated by upper layer signaling, or is determined according to a sequence of channel state information reference signals.

2. The method according to claim 1, wherein a PUCCH format for transmission of the channel state information of the multiple transmission points is a PUCCH format 2/2a/2b or a PUCCH format 3, and the PUCCH format 3 is set by upper layer signaling.

3. The method according to claim 1, wherein different user equipments in the coordinated multi-point cooperating set use the same mapping sequence or different mapping sequences.

4. The method according to claim 1, wherein in performing the multiplexing, the channel state information of the multiple transmission points is fed back in multiple subframes at a predetermined time offset in the mapping sequence, and each of the multiple subframes merely feeds back one piece of channel state information.

5. The method according to claim 4, wherein the time offset is set by upper layer signaling.

6. The method according to claim 4, wherein each of the multiple subframes that feeds back the channel state information of the multiple transmission points is capable of feeding back hybrid automatic repeat request-acknowledgements occurring in the each subframe.

7. The method according to claim 1, wherein in performing the multiplexing, the channel state information of the multiple transmission points is transmitted at a predetermined cyclic shift offset in the same sequence in the mapping sequence.

8. The method according to claim 7, wherein the cyclic shift offset is set by upper layer signaling.

9. The method according to claim 8, wherein channel state information of other transmission points in the multiple transmission points is transmitted at the cyclic shift offset in the same sequence, with respect to channel state information of a serving point.

10. The method according to claim 7, wherein if hybrid automatic repeat request-acknowledgements exist, the hybrid automatic repeat request-acknowledgements are transmitted together with channel state information of a serving point or channel state information of other transmission points in the multiple transmission points.

11. The method according to claim 1, wherein in performing the multiplexing, the channel state information of the multiple transmission points is transmitted by different time-and-frequency resources in the mapping sequence.

12. The method according to claim 11, wherein the different time-and-frequency resources is set by upper layer signaling.

13. The method according to claim 11, wherein if hybrid automatic repeat request-acknowledgements exist, the hybrid automatic repeat request-acknowledgements are transmitted together with channel state information of a serving point or channel state information of other transmission points in the multiple transmission points.

14. The method according to claim 1, wherein a physical uplink control channel of one of the multiple transmission points is a physical uplink control channel of a serving point.

15. The method according to claim 1, wherein in performing the multiplexing, time-division multiplexing, code-division multiplexing, and frequency-division multiplexing are used in combination.

* * * * *